United States Patent [19]

Takahashi et al.

[11] Patent Number: 5,092,576
[45] Date of Patent: Mar. 3, 1992

[54] RECIRCULATING SHEET FEEDING APPARATUS

[75] Inventors: Kozo Takahashi, Nara; Tamami Nagasawa, Osaka, both of Japan

[73] Assignee: Sharp Kabushiki Kaisha, Osaka, Japan

[21] Appl. No.: 560,591

[22] Filed: Jul. 31, 1990

[30] Foreign Application Priority Data

Jul. 31, 1989 [JP] Japan ................................ 1-199727
Dec. 29, 1989 [JP] Japan ................................ 1-342501

[51] Int. Cl.⁵ ............................................. B65H 5/22
[52] U.S. Cl. .................................... 271/3.1; 271/146; 271/98; 271/212
[58] Field of Search ............. 271/3.1, 94, 98, 105, 271/30.1, 34, 146, 220, 221, 212

[56] References Cited

U.S. PATENT DOCUMENTS

| | | |
|---|---|---|
| 4,368,973 | 1/1983 | Silverberg . |
| 4,384,782 | 5/1983 | Acquaviva ........................ 271/3.1 |
| 4,413,901 | 11/1983 | Kollar . |
| 4,595,190 | 6/1986 | Amarakoon ...................... 271/3.1 |
| 4,699,369 | 10/1987 | Zirilli .................................. 271/94 |
| 4,703,923 | 11/1987 | Anderson et al. ................. 271/3.1 |
| 4,893,804 | 1/1990 | Sasage et al. ..................... 271/3.1 |

FOREIGN PATENT DOCUMENTS 0056766 4/1985 Japan ................................ 271/3.1

*Primary Examiner*—H. Grant Skaggs

[57] ABSTRACT

A stack of sheets contained in a containing member is loosened at the downstream edges in the feeding direction by air injected from an air injecting device, and fed one by one seriatim from the sheet on top in a predetermined feeding direction by a vacuum suction feeder disposed above the containing member. At this time, an upwardly directed impact is applied to the downstream edges in the feeding direction of the sheets from an impact generating device, thereby improving looseness of the downstream edge faces in the feeding direction by the air.

The sheet fed from the containing member is returned to the bottom of the stack of sheets on the containig member. At this time, a claw formed on a feed roller pushes up the upstream edges in the returning direction of the sheet so as to force the sheet completely into the containing member.

15 Claims, 14 Drawing Sheets

Fig. 8(a)
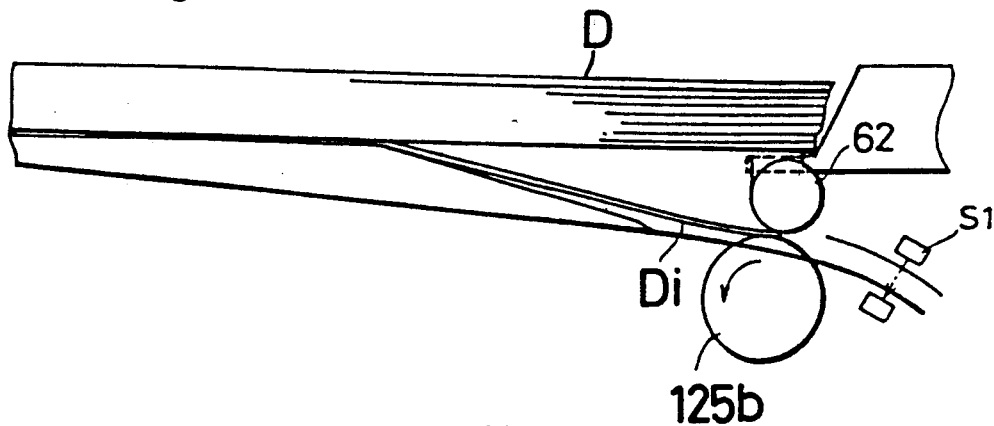
Fig. 8(b) (2)
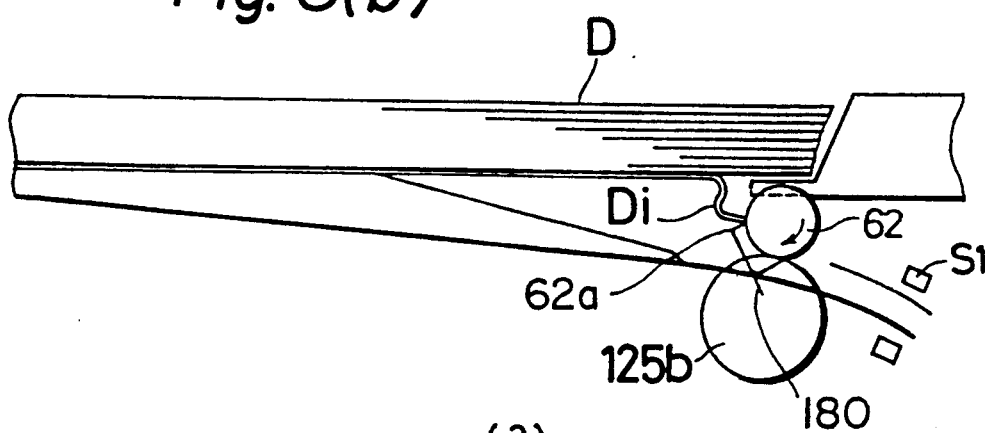
Fig. 8(c) (3)
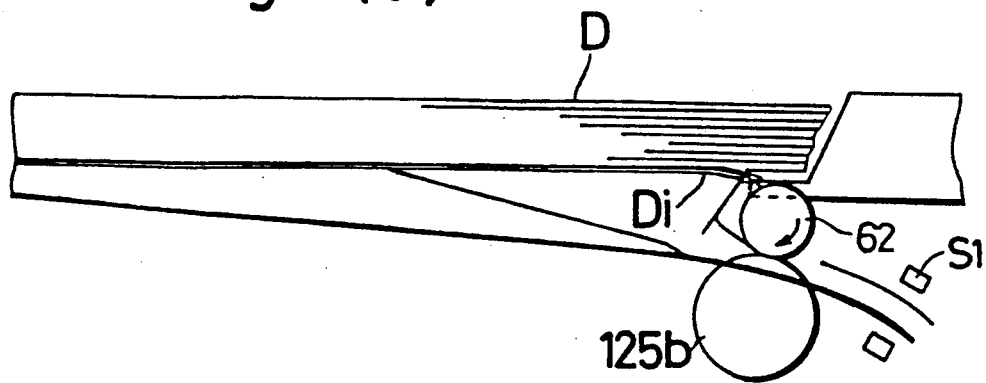

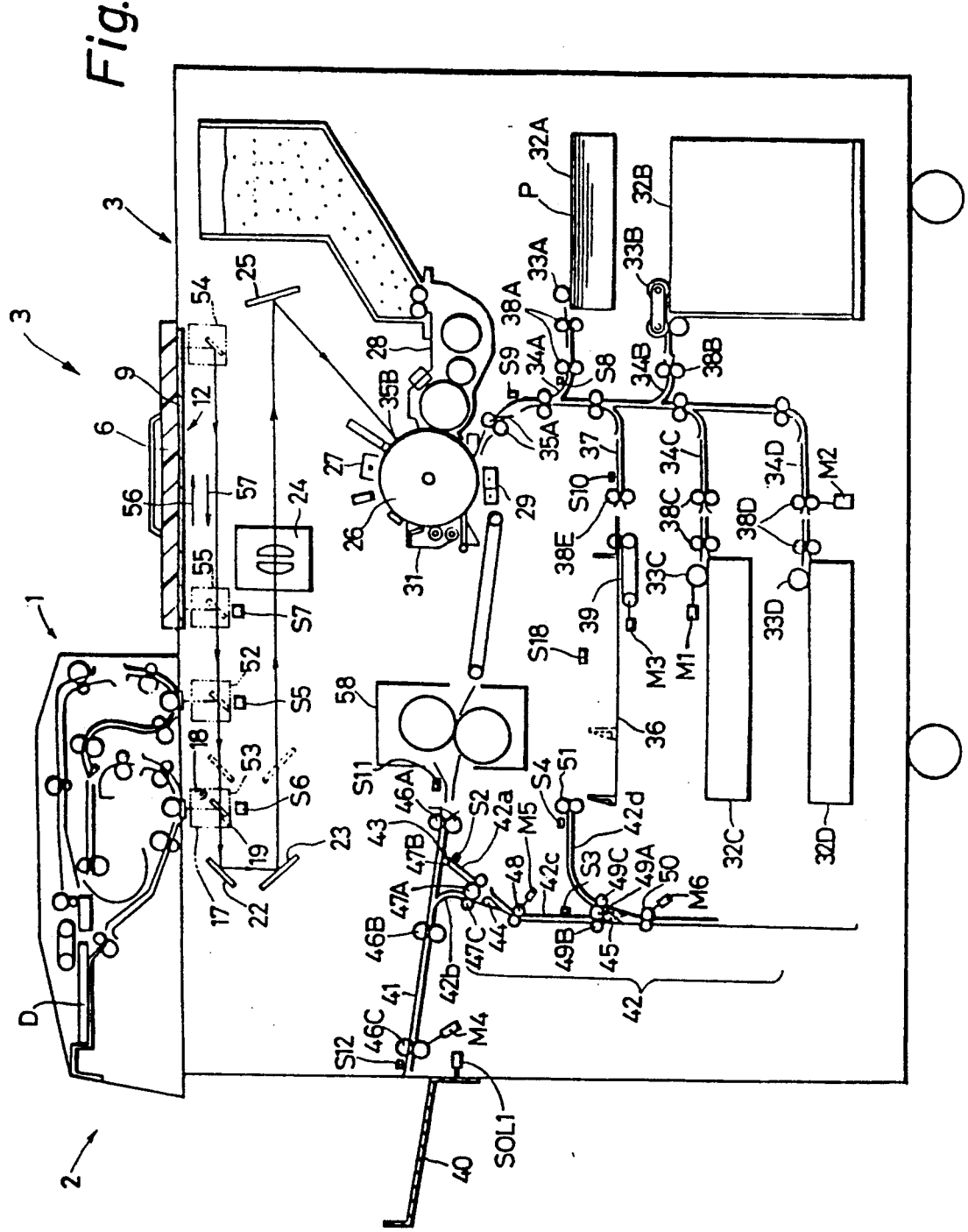

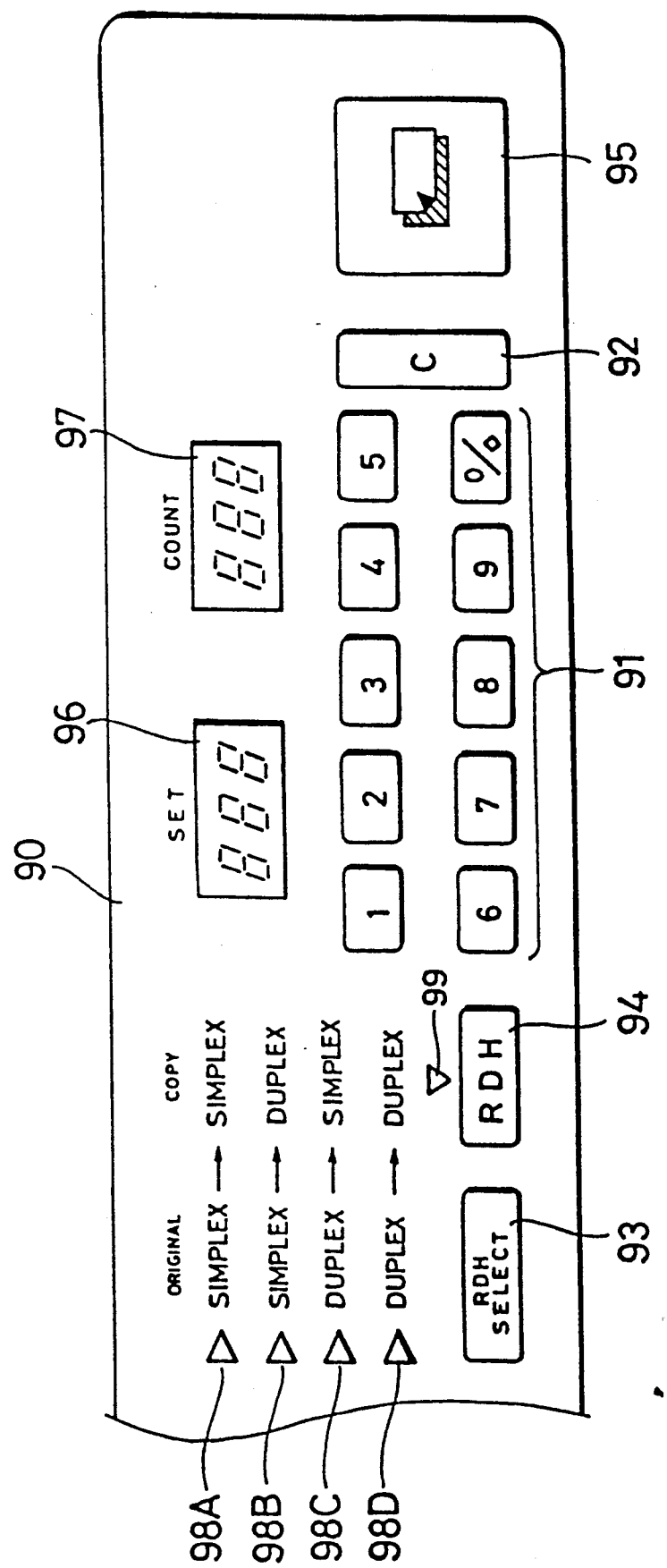

RECIRCULATING SHEET FEEDING APPARATUS

BACKGROUND OF THE INVENTION

1. Field of the Invention

The present invention relates to a recirculating sheet feeding apparatus embodied preferably in a recirculating automatic document feeder, which is used in a copying machine and the like for feeding documents seriatim to an exposure station from a document table onto which a plurality of document sheets are stacked, and returning the documents from the exposure station to the document table after exposure.

2. Description of the Prior Art

Recently, in an electrostatic copying machine, it has been known to install a document feeder which transports a stack of documents seriatim to a reading station for optical scanning of a plurality of equal-sizes document sheets.

In such a document feeder in the prior art for feeding the documents stacked on a document table to a transporting path wherein the reading station is formed, air is blown against the edge faces of the documents from the downstream side in the feeding direction. Thereby, the edge faces of the documents on the downstream side in the feeding direction are loosened.

In this state, by vacuum sucking means and an endless feeding belt provided above the document table, the document on top of the plurality of document sheets is sucked onto the peripheral surface of the feeding belt so as to be fed to the transporting path.

In the document feeder constructed as described above, when the material or quantity of stacked document sheets to be fed varies, feeding conditions between feeding means changes, thus the document edges on the downstream side in the feeding direction are loosened insufficiently. As a result, sometimes a plurality of document sheets are sent as a single sheet of a document, and so-called multiple feeding takes place. Also, when the document is sucked onto the feeding belt by an insufficient vacuum sucking means, a poor feeding such as clogging may occur at feeding from the document table.

In some copying machines, a recirculating automatic document feeder which sends out the document seriatim from top of a stack of documents on a document table, and returns it to the bottom of the document table after the document has been exposed at an exposure station is installed. As disclosed, for example, in U.S. Pat. Nos. 4,413,901 and 4,368,973, in the conventional recirculating automatic document feeder, it was a common practice that a stack of documents on the document table were lifted and replaced after the document was returned and fed thereunder.

However, in the case wherein the document is returned in the manner aforementioned, it is complicated to control up-and-down movement of the stack of documents, causing the feeder itself to become larger. Besides, when the documents are moved up and down, their sides tend to become misaligned and corners to be turned up or down.

Although though it may be considered to force the document into the bottom of the stack of documents with a roller utilizing a stiffness of the document, in this case, since the document stops when its rear end has passed the roller, in order to return the document to a given position, a plurality of rollers or a transporting belt must be provided on the document table so as to keep pushing until the document is returned reliably to the given position. However, in such a case, the document may be stained by the duration of contact with the rollers or the transporting belt.

SUMMARY OF THE INVENTION

It is an object of the present invention to provide a recirculating sheet feeding apparatus capable of feeding sheets stably irrespective of the material and the quantity of sheets to be fed.

It is another object of the invention to provide a recirculating sheet feeding apparatus capable of returning the sheets reliably to a containing member without damaging and staining the sheets such as documents.

The invention is directed to a recirculating sheet feeding apparatus which feeds a sheet from the top of a stack of sheets contained in the containing member, and returns to the bottom of the stack of sheets, said recirculating sheet feeding apparatus comprising:

a vacuum suction feeder which is disposed on the upper opposite side of the containing member for sucking a sheet on top of the sheets contained to feed in a predetermined feeding direction:

air injecting means which is installed on a downstream side with respect to a in the feeding direction of the containing member for injecting air against edges on the downstream side in the feeding direction of the sheet; and impact generating means for applying an impact directing upward to the edges on the downstream side in the feeding direction of the sheet contained in the containing member.

According to the invention, a stack of sheets contained in the containing member is loosened at the edge faces on the downstream side in the feeding direction by air injected from the air injecting means, and fed seriatim in a predetermined feeding direction from the sheet on top of the stack by a vacuum suction feeder disposed above the containing member.

At this time, to the downstream edge in the feeding direction of the sheet, the impact is applied upwardly from the impact generating means to improve looseness of the downstream edge face in the feeding direction given by the air. Thereby, the multiple document feeding by a vacuum suction feeder can be prevented and the reliable sheet feeding operation can be accomplished.

According to the invention, a stack of sheets contained in the containing member are made separable from each other by the impact applied upwardly from the impact generating means, and the edge faces are loosened by air injected from the air injecting means, so that the sheet on top can be sucked and fed in the predetermined feeding direction by the vacuum suction feeder. As a result, irrespective of the material and quantity of the sheets, both multiple feeding and poor feeding can be prevented, and thus the sheets can be fed stably and reliably.

The invention is characterized by a recirculating sheet feeding apparatus having a containing member housing a stack of sheets, which feeds a sheet from the top of a stack of sheets contained in the containing member, and returning the sheet to the bottom of the sheets in the containing member contained, said recirculating sheet feeding apparatus being provided with a notch on the upstream edge in the sheet returning direction of the containing member, upper and lower rotary shafts disposed underneath the notch and connected respectively to driving means for returning the sheet fed to the containing member, the upper rotary shafts comprising a driven roller engaged rotatably thereto, and a feed roller having a claw for pushing out the rear edge of the sheet when the upper rotary shaft is rotated, and the lower rotary shaft comprising a driving roller contacting the driven roller.

The invention is characterized by a recirculating sheet feeding apparatus having a containing member containing a stack of sheets, which feeds a sheet from the top of the stack of sheets, and returns to the bottom of the stack of sheets, comprising:

a first rotary shaft being disposed on the upstream side in the sheet returning direction of the containing member;

a driven roller engaged rotatably on the first rotary shaft;

a feed roller being fixed on the first rotary shaft and having a claw for pushing up the edge in the sheet returning direction of the sheet when the sheet is in the containing member;

a first driving means for driving and rotating the first rotary shaft;

a second rotary shaft disposed under the first rotary shaft;

a driving roller being fixed on the second rotary shaft and contacting the driven roller; and a second driving means for driving and rotating the second rotary shaft.

The invention is directed to a recirculating sheet feeding apparatus comprising the containing member provided with a rib thereon along the transporting direction of the sheet.

According to the invention on the upstream side in the document returning direction of the containing member, there is provided a notch and the sheets are stacked on the containing member. Underneath the notch, the upper and lower (the first and second) rotary shafts connected respectively to the driving means (the first and second driving means) are disposed. On the upper rotary shaft, the driven roller is rotatably engaged with the upper rotary shaft and the feed roller is fixed to the upper rotary shaft. The feed roller includes a claw which pushes out the document when the upper rotary shaft is rotated. The claw may have any shape. The lower rotary shaft is provided with the driving roller in contact with the driven roller.

In the invention, the sheet is fed and sent by the rotation of the driving roller and the driven roller and forced into the bottom of a stack of sheets. However, when the rear edge of the sheet reaches the driving and driven rollers it is stopped. Here, when the upper rotary shaft is rotated, the claw of the feed roller is pushed up to the rear edge of the sheet to bring the document into complete alignment with the stack of sheets.

When the rib is provided on the containing member, friction between the sheet and the containing member is lessened to facilitate the sheet feeding, and at the same time, the sheet is prevented from bending perpendicularly to the transporting direction, thus jamming and wrinkling of the sheet may be eliminated.

According to the invention, since the sheet is forced in as it is without lifting the stack of sheets, the complicate up-and-down control of the sheets is not necessary and the corners of the sheet do not turn up or down. Also, the sheet can be fed to the ultimate end without using a number of rollers and the belt, preventing the sheet surface from becoming stained.

BRIEF DESCRIPTION OF THE DRAWINGS

Other and further objects, features, and advantages of the invention will be more explicit from the following detailed description taken with reference to the drawings wherein:

FIGS. 8 8(a)–8(c) are side views illustrating the document returning operation;

FIG. 9 is a schematic sectional view of a copying machine 2 including a document feeder 1;

FIG. 10 is a partial plan view of a control panel 90; and

DETAILED DESCRIPTION OF THE PREFERRED EMBODIMENTS

Figure 1:
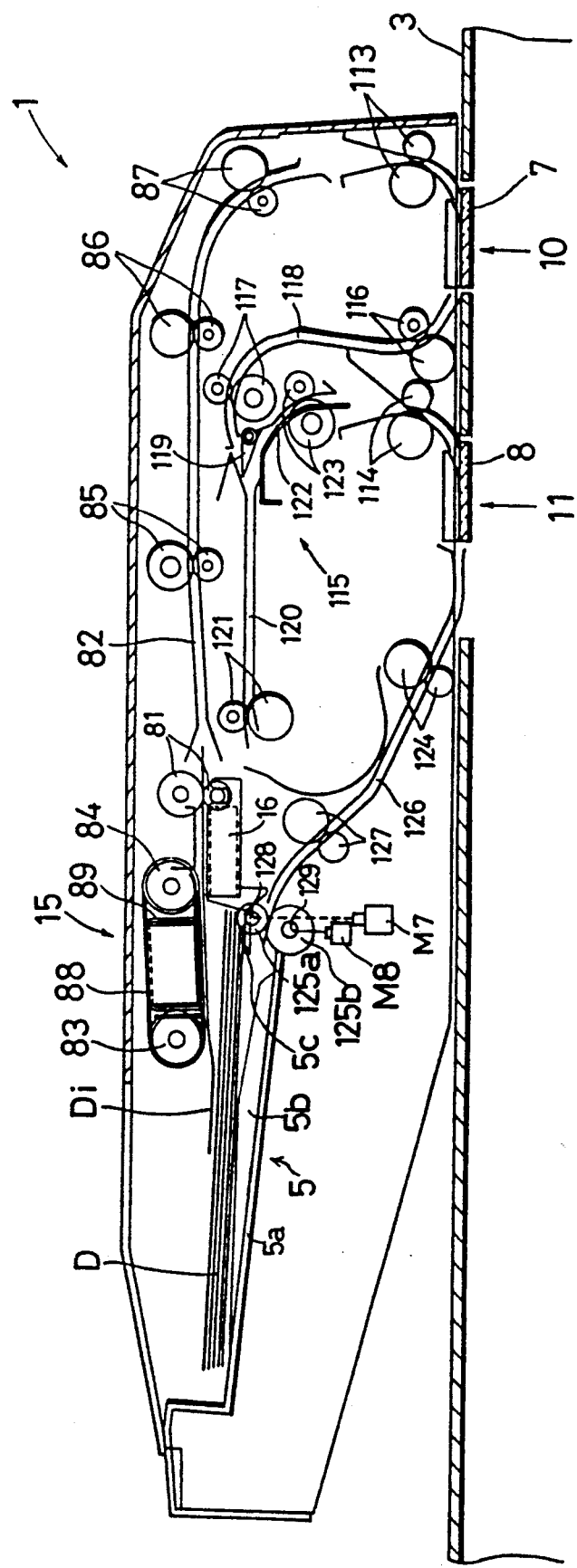
FIG. 1 is a schematic sectional side view showing a document feeder 1 as one embodiment of the invention.

Now referring to the drawing, preferred embodiments of the invention are described below.

FIG. 1 is a schematic sectional side view showing a recirculating document feeding apparatus 1 as one embodiment of the invention. The document feeder 1 is provided on a copying machine 2 explained with reference to FIG. 9 through FIG. 11 to be described later, and preferably used for copying a plurality of equal-size document sheets effectively.

On a body 3 of the copying machine 2, there are provided the document feeder 1 and a pressing plate 6. A first transparent plate 7 and a second transparent plate 8 disposed on the document feeder 1 respectively constitute a first reading station 10 and a second reading station 11. On the pressed surface of the body 3 with respect to the pressing plate 6, a third transparent plate 9 is formed as a document platen to constitute a third reading station 12. A document image of a book and so on is presented on the third reading station 12 for exposure.

Referring to FIG. 1, a plurality of equal-size document sheets D arranged in order of pages are placed on a placing member 5 which is a containing member of the document feeder 1 such that the document surface on the first page is directed downward. The documents D placed on the placing member 5 are loosened at the edge faces by air fed from an exhaust duct 16 disposed on the right-hand side thereof, taken out seriatim from top by a feeder 15 arranged on the upper side and fed to a transporting path 82 by means of a feed roller 81.

The feeder 15 comprises a belt 88 installed on rollers 83, 84 and a duct 89 open against the document D on the inner surface side of the belt 88. A plurality of suction holes are intermittently formed in the belt 88 and a vacuum suction device (not shown) is connected to the duct 89. Thereby, the document Di is tacked to the peripheral surface of the belt 88 and fed to the transporting path 82 as the rollers 83, 84 are driven and rotated. The exhaust duct 16 is connected, for example, to an induced fan to loosen the edge faces of the document D on the downstream side in the feeding direction B by blowing air thereto at feeding thereby preventing multiple feeding.

The transporting path 82 consists of a pair of guide members and pairs of plural rollers 85, 86, 87 disposed along the transporting direction for transporting the document Di fed onto the first transparent plate 7. Here, a pair of first resist rollers 113 are disposed at the outlet side, of the first transparent plate 7 in the transporting path 82. Power transmitting means are coupled to a rotary shaft of the first resist rollers 113 via a clutch CLTI (not shown). The first resist rollers 113 are rotated and stopped by the on/off control of the clutch CLT1 to control the transporting timing of the document Di to the first transparent plate 7.

When the document Di is pressed against the first transparent plate 7 and transported, the document image on one surface is presented to the first reading station 10. Then, the document Di is transported onto the second transparent plate 8 by second resist rollers 114 after its transporting direction is inverted by inverting means 115.

In the inverting means 115, the document Di from the first reading station 10 is led into a transporting path 120 from a transporting path 118, formed by a pair of guide members and pairs of transporting rollers 116, 117 disposed along the transporting direction via a switching claw 119. In the transporting path 120, an inverting roller 121 which is rotatable in normal and reverse directions is disposed. The document Di transported to the transporting path 120 is transported to a transporting path 122 by the inverting roller 121 inverting in the rotating direction and the switching claw 119. The document Di led into the transporting path 122 is sent to the second resist rollers 114 by means of a transporting roller 123.

Power transmitting means is coupled to a rotary shaft of the second resist rollers 114 via a clutch CLT2 not shown. The second resist rollers 114 are rotated and stopped by the on/off control of the clutch CLT2 to control the transporting timing of the document Di to the second transparent plate 8. The document Di pressed against the second transparent plate 8 and transported is inverted in the transporting direction in the inverting means 115 in advance, and a document image on the other surface is presented to the second reading station 11.

The document Di whose images on both surfaces have been presented is guided through a transporting path 126 and transported to the placing member 5, by a pair of guide members and pairs of transporting rollers 124, 127 disposed along the transporting direction. The document Di being transported is returned to the bottom of the documents D stacked on the placing member 5 by a pair of transporting rollers 125 disposed in the vicinity of the containing end portion of the placing member 5. The pair of transporting rollers 125 are consist of a driven roller 125a and a driving roller 125b.

The placing member 5 comprises a body 5a, a rib 5b projected on the body 5a and a supporting plate 5c provided above the body 5a for supporting the edge of the document D. Transporting rollers 125 are installed underneath the supporting plate 5c.

Figure 2:
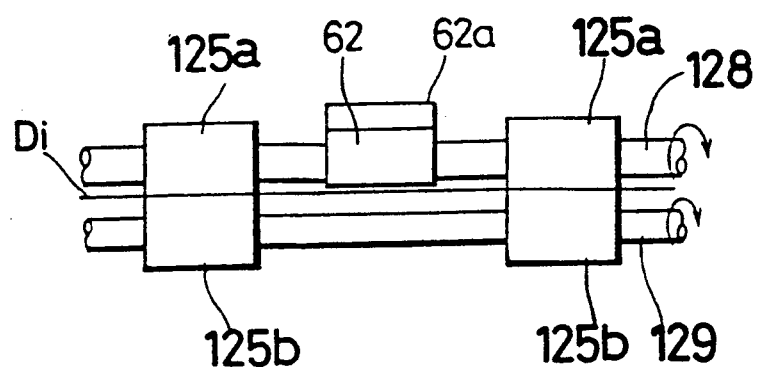
FIG. 2 is a front view showing a configuration associated with a transporting roller 125.
Figure 3:
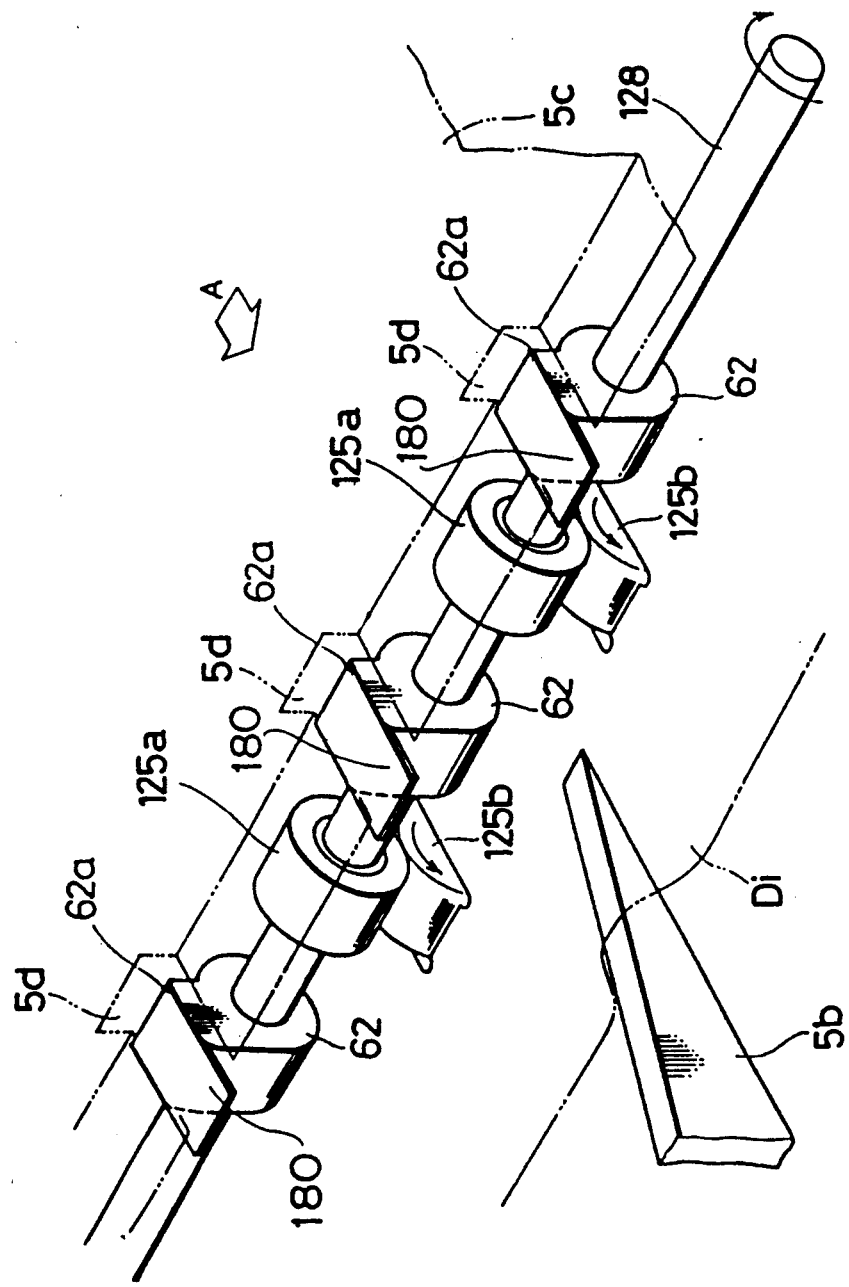
FIG. 3 is a perspective view showing a configuration associated with a transporting roller 125.
Figure 4A:
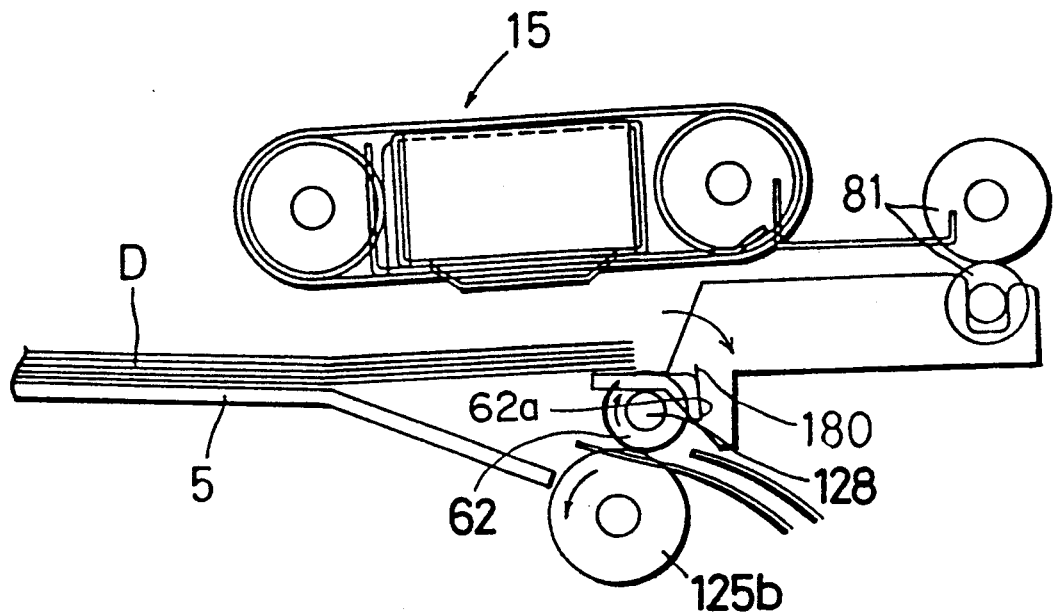
FIGS. 4(a)–4(d) are views for explaining the operation of a kick-up member 180 at feeding of a document feeder 1.
Figure 4B:
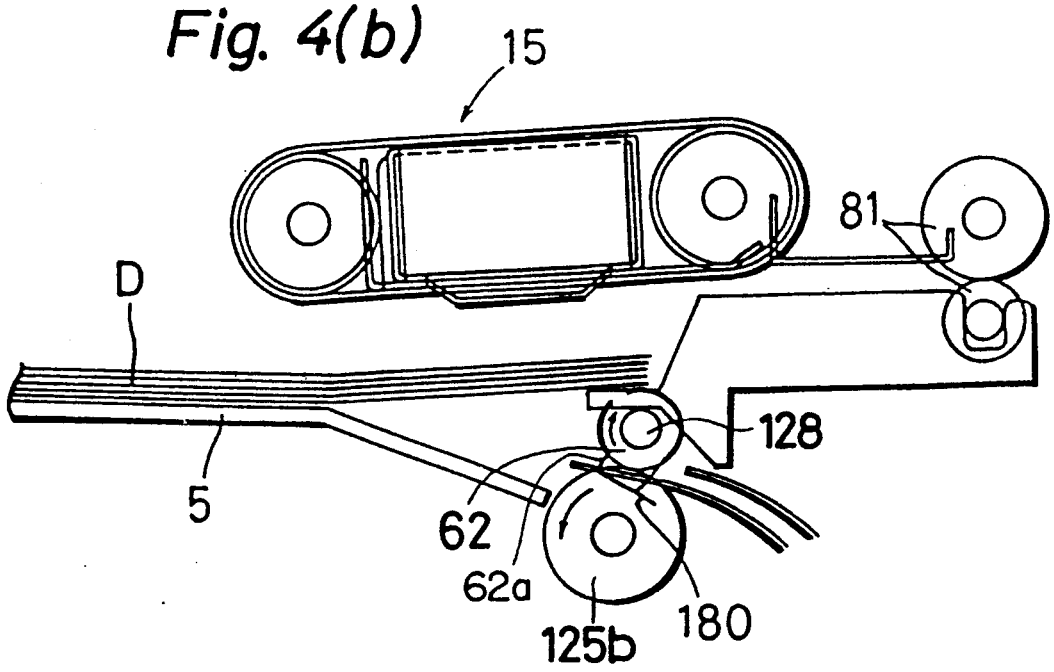
Figure 4C:
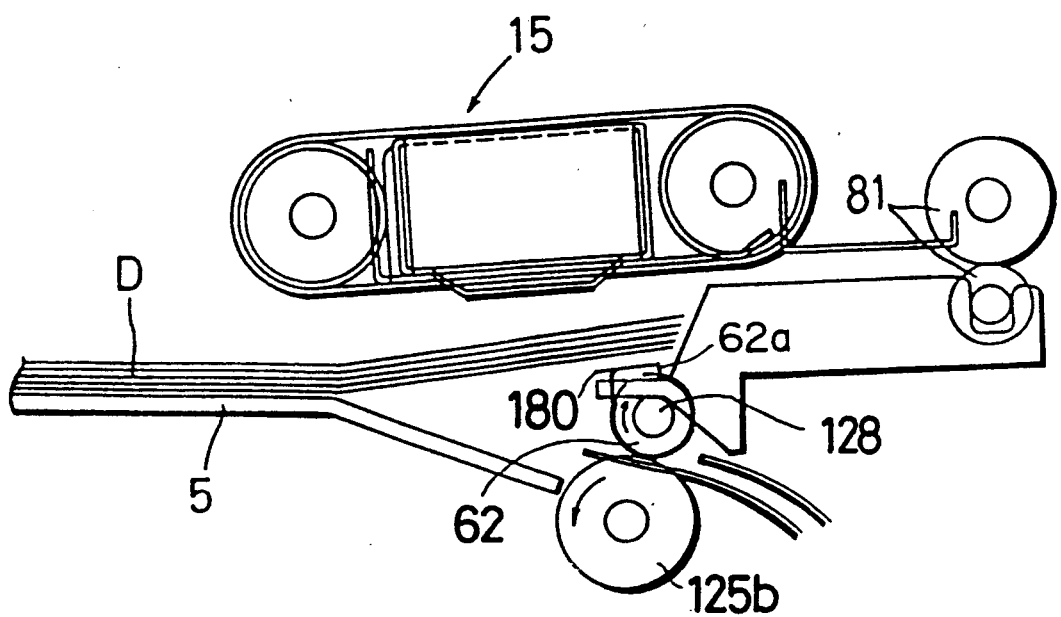
Figure 4D:
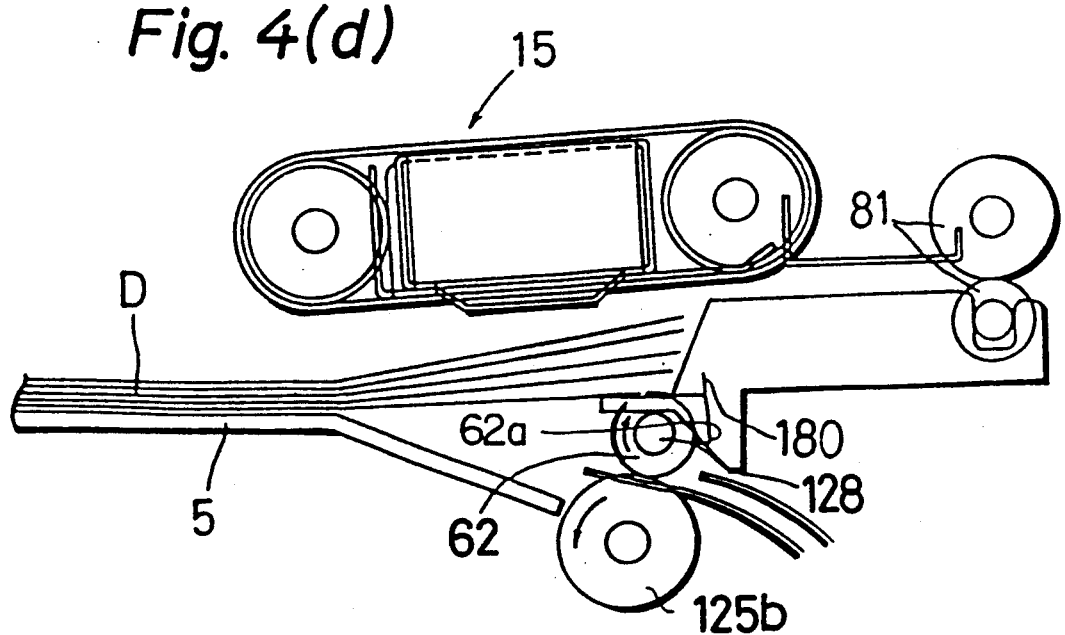

FIG. 2 is a front view showing a configuration associated with the transporting rollers 125, and FIG. 3 is a perspective view showing a configuration associated with the transporting rollers 125.

On an upper rotary shaft (a first rotary shaft) 128, a driven roller 125a rotatably engages to the upper rotary shaft 128 and a feed roller 62 fixed to the upper rotary shaft 128 are provided. The feed roller 62 includes a claw 62a which pushes the document Di out from the transporting path 126 when the upper rotary shaft 128 is rotated. The claw 62a may have any shape. A driving roller 125b contacting to the driven roller 125a is provided on a lower rotary shaft (a second rotary shaft) 129.

In the embodiment, a document returned through an exposure station or the like is sent and forced into the bottom of a stack of documents D by the driving roller 125b and the driven roller 125a. However, when the rear end of the document Di reaches the transporting rollers 125, it is stopped. Here, when the upper rotary shaft 128 is rotated, the claw 62a of the feed roller 62 pushes up the rear edge of the document to bring the document Di in a complete alignment with the stack of documents D.

When the rib 5b is provided on the placing member 5, friction between the document Di and the placing member 5 is lessened to facilitate the document feeding, and at the same time, the document Di is prevented from bending perpendicularly to the transporting direction A, thus jamming and wrinkling of the document Di may be eliminated.

The upper rotary shaft 128 is provided perpendicularly to the transporting direction A of the document Di, and connected to motor M7 so as to be rotatable in the direction of arrow A. The driven roller 125a and the feed roller 62 are disposed on the upper rotary shaft 128. The driven roller 125a is rotatably engaged with the upper rotary shaft 128. The feed roller 62 is fixed to the upper rotary shaft 128. The roller 62 is provided with the claw 62a formed at a portion of the peripheral surface thereof, and when the upper rotary shaft 128 is at a standstill, the claw 62a is positioned at the upper side to support the stack of documents D. That is, notches 5d are formed on an upper guide plate 5c, through which the upper end of the claw 62a is projected and stopped. Accordingly, the stack of documents D can be stacked thereon.

In the placing member body 5a, an opening is formed at the position opposing the driven roller 125a, through which the driving roller 125b is contacting to the driven roller 125a. Though the rib 5b provided on the placing member body 5a may be of any shape, it is preferable to provide the rib with a gentle angle as shown in the figure. On the upstream side in the transporting direction A of the upper rotary shaft 128 and the lower rotary shaft 129, there is disposed a sensor S1 (see FIG. 8). The sensor S1 is a penetration type optical sensor which detects the document returned. The upper rotary shaft 128 is driven and rotated, the lower rotary shaft 129 is driven and rotated.

FIG. 4 is a view for explaining a configuration and operation of the feed roller 62 as an impact generating means in the document feeder 1. On the feed roller 62 to which torque from a motor M7 is transmitted through the upper rotary shaft 128, a kick-up member 180 is disposed on its peripheral surface. The kick-up member 180 is driven and rotated in order shown in FIGS. 4(a) through 4(d) as the feed roller 62 is driven and rotated, thereby applying the impact in an upward direction to the downstream edges in the feeding direction B of the documents D stacked on the placing member 5.

For the a kick-up member 180, a flexible synthetic resin material such as polyethylene terephthalate (PET) having a width of 10 mm and a thickness of 0.25 mm and the like is selected so as not to damage the documents D when contacting therewith. A plurality of kick-up members 180 are provided partially along the axial direction of the driving roller 125a, for example, at 2 to 4 locations.

As a kick-up mode of the kick-up member 180, the feed roller 62 may be rotated at a relatively higher speed such as a circumferential speed of about 400 mm/sec. to apply the impulsive upward force to the downstream edges in the feeding direction of the documents D, or at a relatively lower speed on relax the impact to the documents D. It is also possible to separate the documents from each other not only by rotating the kick-up member 180, but also by reciprocally driving and angularly displacing the kick-up member 180 within a given angle to apply the impact to the edge portion of the document D.

FIG. 5 is a view for explaining the feeding operation of the documents D in the document feeder 1. As to be described later, when the operator places the documents D on the placing member 5 and operates a print switch 95 and so on on a control panel 90 to start the copying operation using the document feeder 1, which operates as shown in FIGS. 5(a) through 5(d) every time immediately before the documents D are fed to the transporting path 82.

Figure 5A:
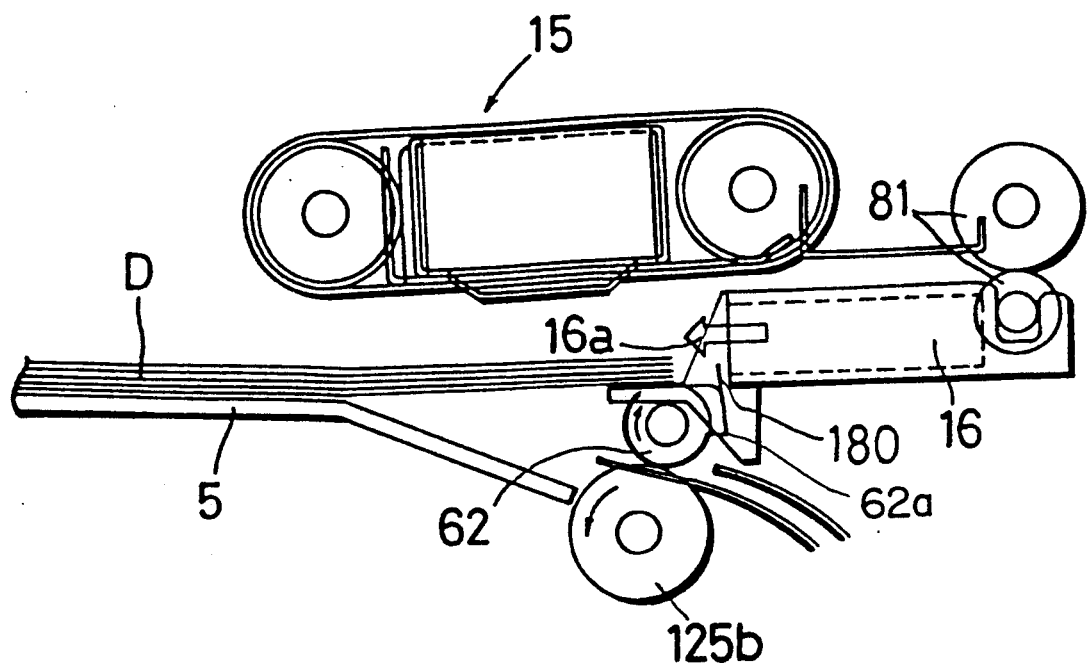
FIGS. 5(a)–5(d) are views for explaining the feeder operation of a document feeder 1.
Figure 5B:
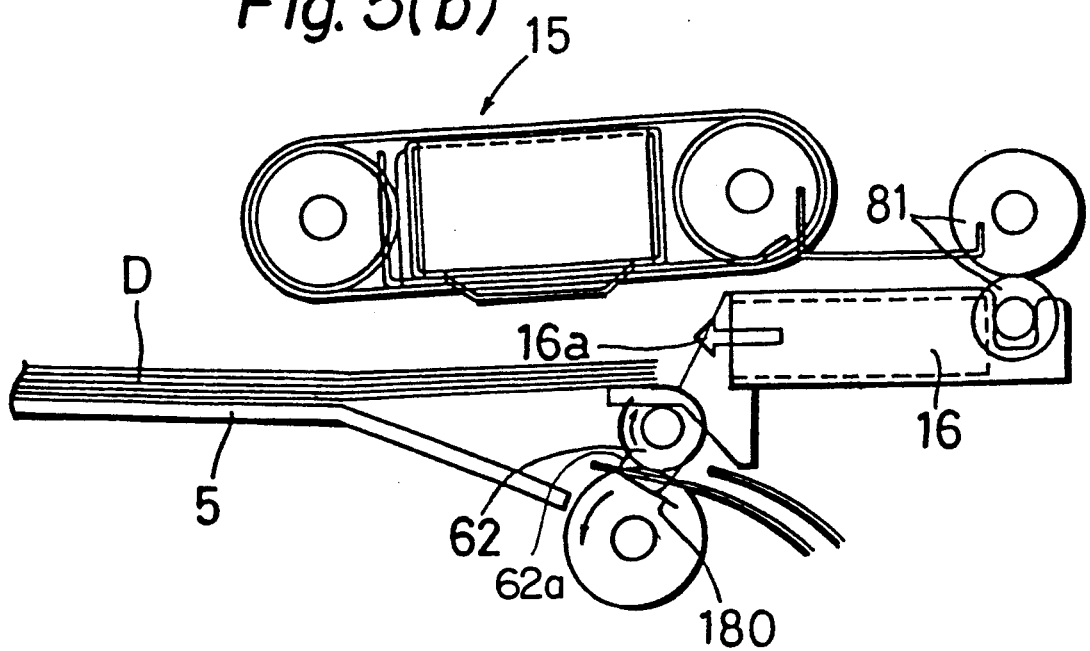
Figure 5C:
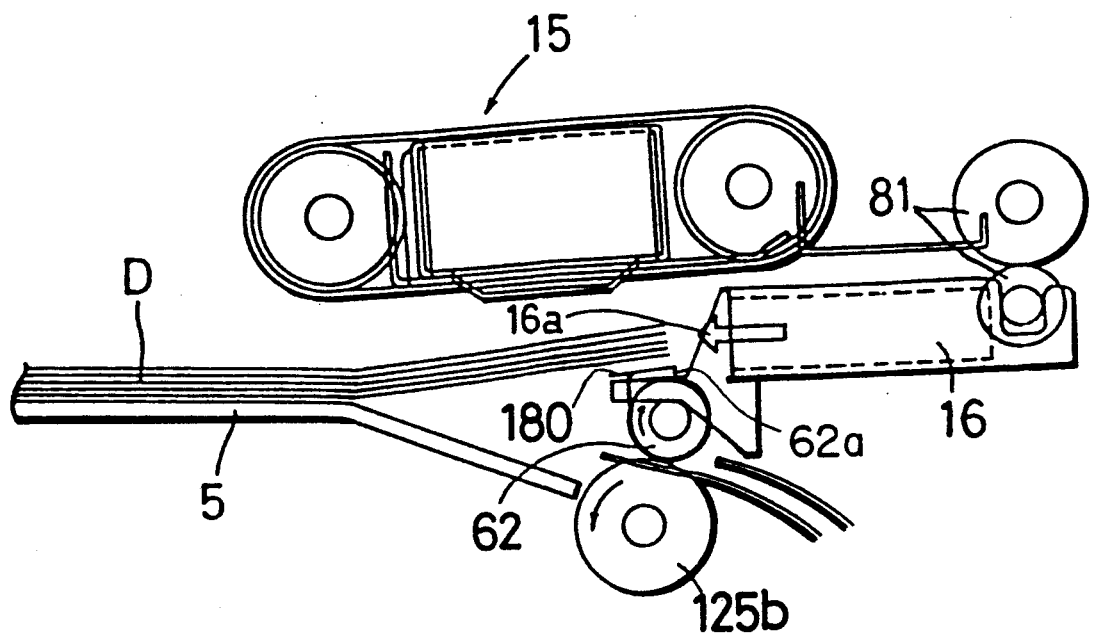
Figure 5D:
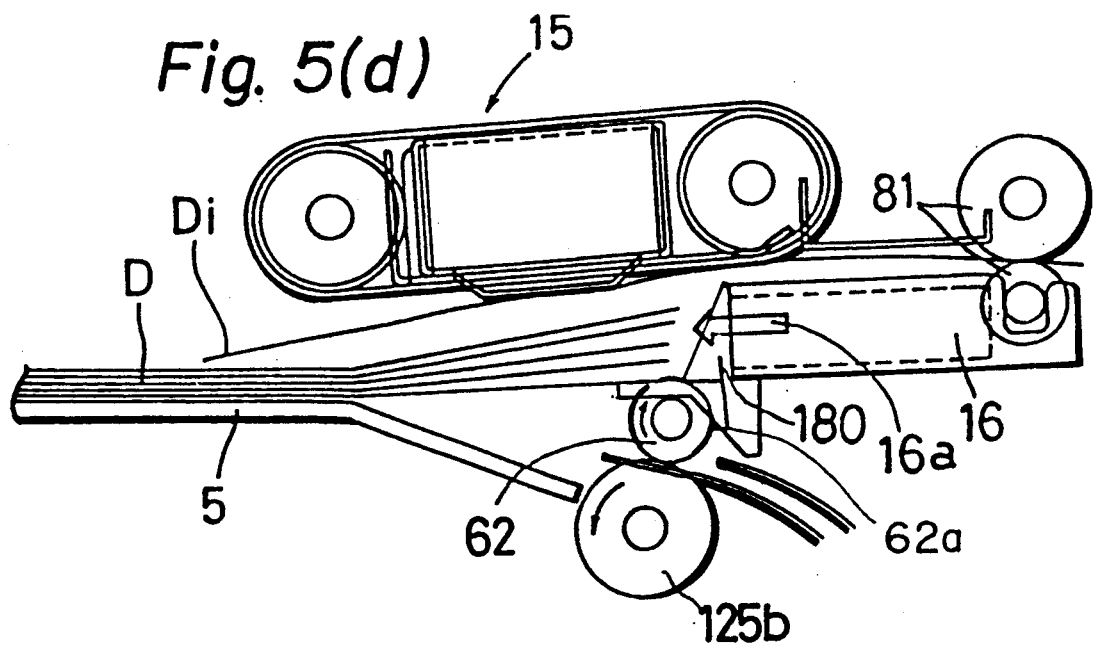
Figure 6A:
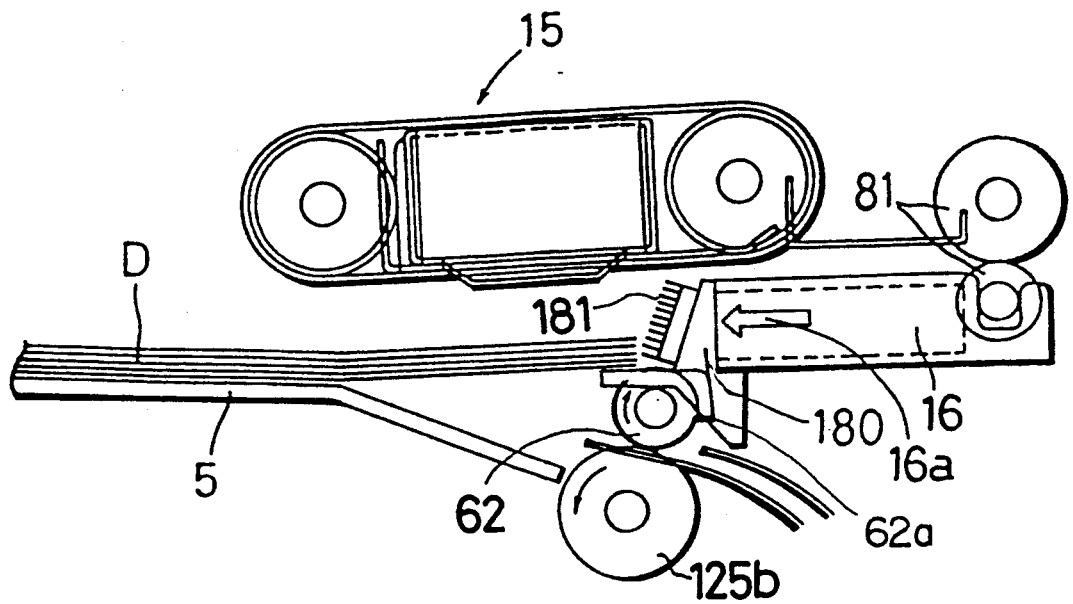
FIGS. 6(a)–6(d) are views for explaining a configuration and operation of another embodiment of the invention.
Figure 6B:
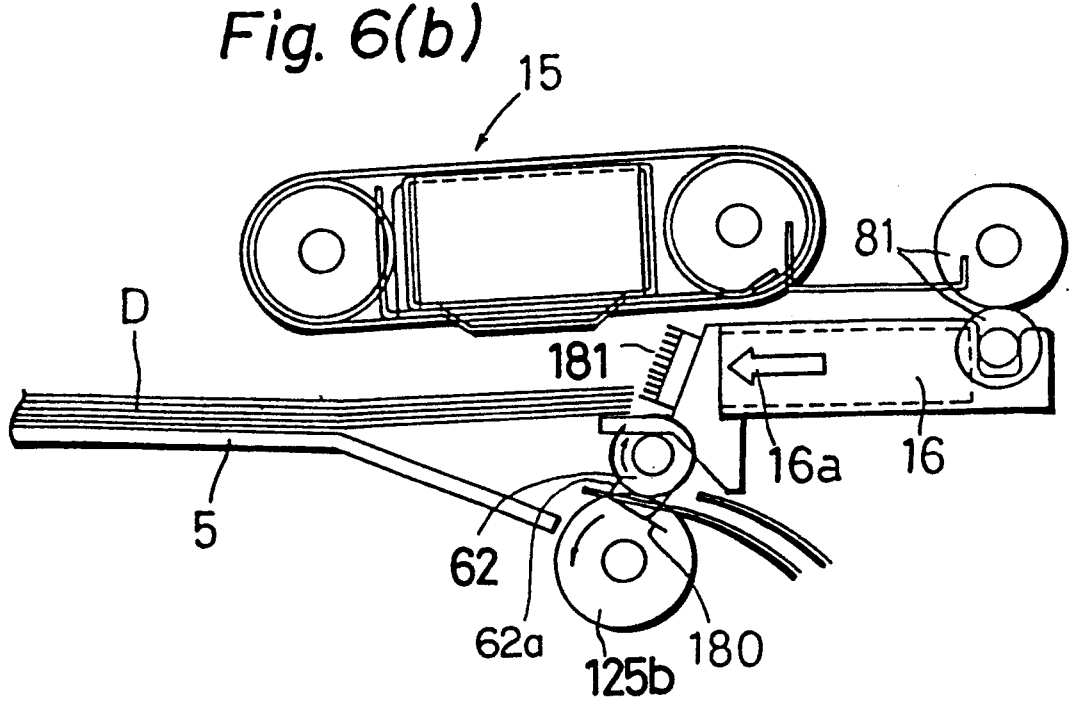
Figure 6C:
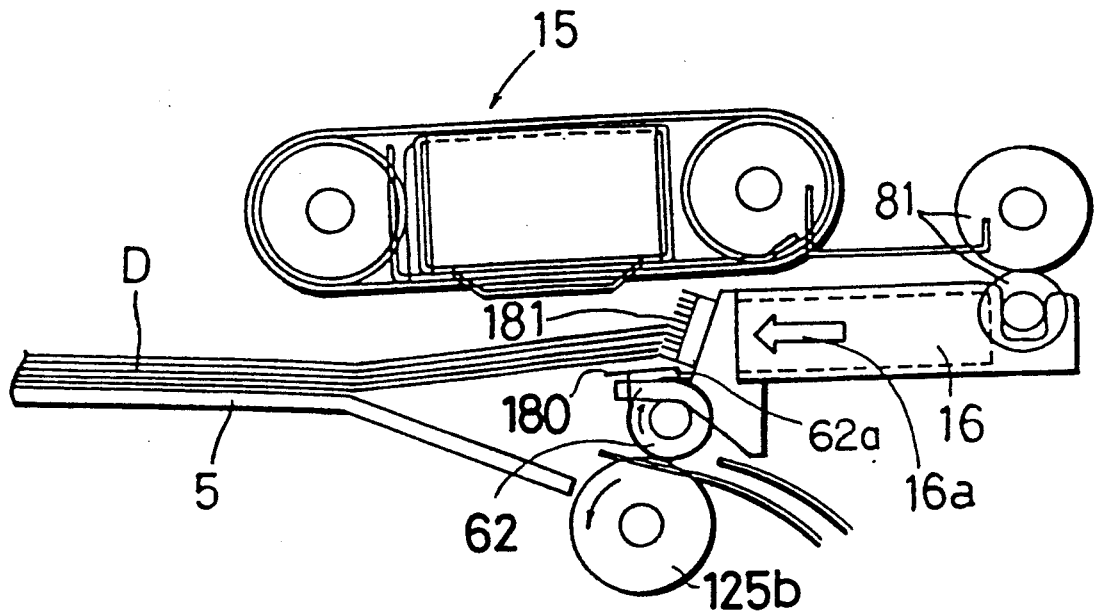
Figure 6D:
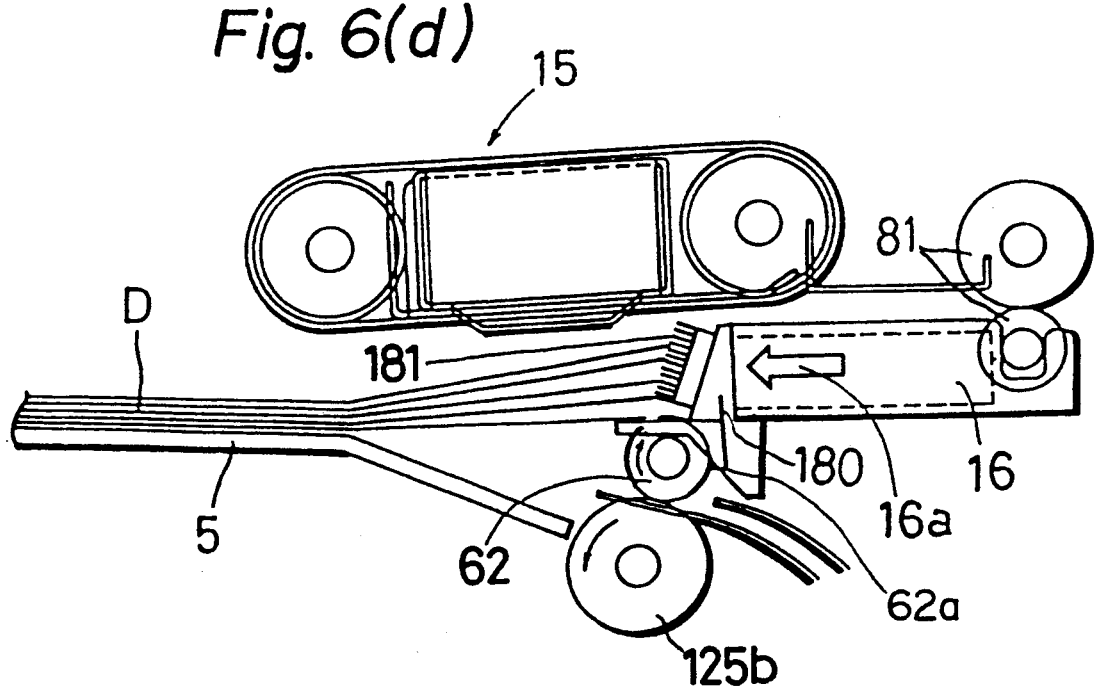

That is, as the feed roller 62 including the kick-up member 180 is driven and rotated clockwise in the description, the kick-up member 180 kicks up the downstream edges in the feeding direction B of the documents D and applies the impact upwardly at a position shown in FIG. 5(c). Then, when the kick-up member 180 is detached from the document edge, the end portion of the kick-up member 180 loosens the downstream edges in the feeding direction B of the documents D.

Thereby, air 16a from the exhaust duct 16 is blown against the documents D for separation thereof by the air flow. After such operation being effected once or more times before feeding the documents, a document Di on top is fed to the transporting path 82 by the feeder 15 disposed above the downstream side in the feeding direction B. By repeating such operation whenever the documents D are fed, the documents can be fed stably without multiple feeding, and the reliability of the document feeding operation of the document feeder 1 is improved.

FIG. 6 is a view for explaining a configuration and operation of another embodiment of the invention. In the embodiment, a loosening brush 181 is provided between the stack of documents D and the exhaust duct 16 in the midway portion of the path, where the downstream edges in the feeding direction B of the documents kicked up upward by the kick-up member 180 drop due to its flexibility. As the loosening brush 181, for example, a moquette consisting of a synthetic fiber and having a fiber length of 3 mm and 188 bundles/sq. in, is selected.

By providing such a fibrous or needle-shaped loosening brush 181, loosening conditions of the documents D by the kick-up member 180 immediately before the feeding of document Di can be improved. That is, as shown in FIGS. 6(a) through 6(d), when the kick-up member 180 is driven and rotated and the edges of the documents D are kicked upward by the kick-up member 180 drop, they contact to the loosening brush 181 so as to be separated from each other and held in that state. Accordingly, the edge faces of the documents D may be loosened efficiently by air 16a from the exhaust duct 16. Since the edges of the documents D loosened once are held in that state by the loosening brush 181 as such, the feeder 15 is able to reliably feed the document on top of the documents D seriatim to the transporting path 82.

Figure 7:
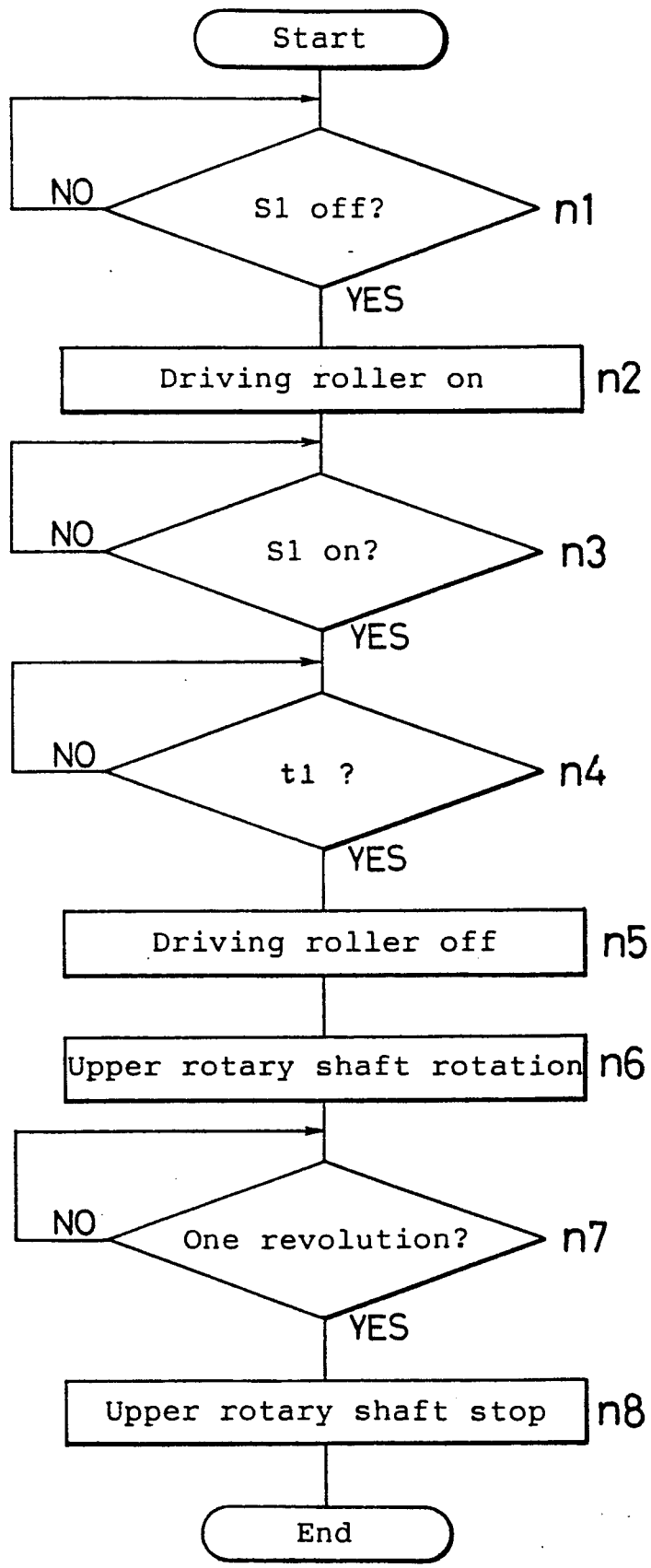
FIG. 7 is a flow chart illustrating the document returning operation.

FIG. 7 is a flow chart for explaining the operation of the document container 5, and FIG. 8 is a side view showing the operation of the document container 5.

First, when a sensor S1 detects the document Di returned and turns off, a driving force is transmitted to the lower rotary shaft 129 to drive the driving roller 125b and the driven roller 125a (Step n1 → Step n2). Thereby, the document Di is sent to the bottom of the stack of documents D. At this time, since the rib 5b is provided on the placing member 5, friction between the document Di and the placing member 5 is lessened to allow the document Di to be fed smoothly, thus jamming and wrinkling can be prevented. Subsequently, the rear edge of the document passes through the neighborhood of the sensor S1, which is turned on to stop the transporting rollers 125 after a predetermined time t1 from the on signal (Step n3 → Step n5). The time t1 corresponds to a quotient of distance between the sensor S1 and the transporting roller 125 and document transporting speed. FIG. 8(a) shows the state of document Di at this time point, wherein the document's rear end is stopped between the transporting roller 125.

When the transporting roller 125 is stopped, the upper rotary shaft 128 makes one revolution in place thereof (Step n6 → Step n8). When the upper rotary shaft 128 starts to rotate, the stack of documents D drop once on the upper guide plate 5c. As the distance of drop is short and restricted to the open and of the stack of documents D, corners of the documents will never turn up or down. Then, the feed roller 62 is rotated to allow the claw 62a to catch the document's rear edge and feed the document Di toward the stack of documents as shown in FIG. 8(b), and finally the document Di is overlapped with the stack of documents D (FIG. 8(c)). At this time in the apparatus of the embodiment, since the document Di and the stack of documents D are lifted simultaneously by the claw 62a and overlapped, the document Di can be completely overlapped with the stack of documents D. Rotating conditions of the upper rotary shaft 128 can be detected by an encoder and the like.

Figure 11:
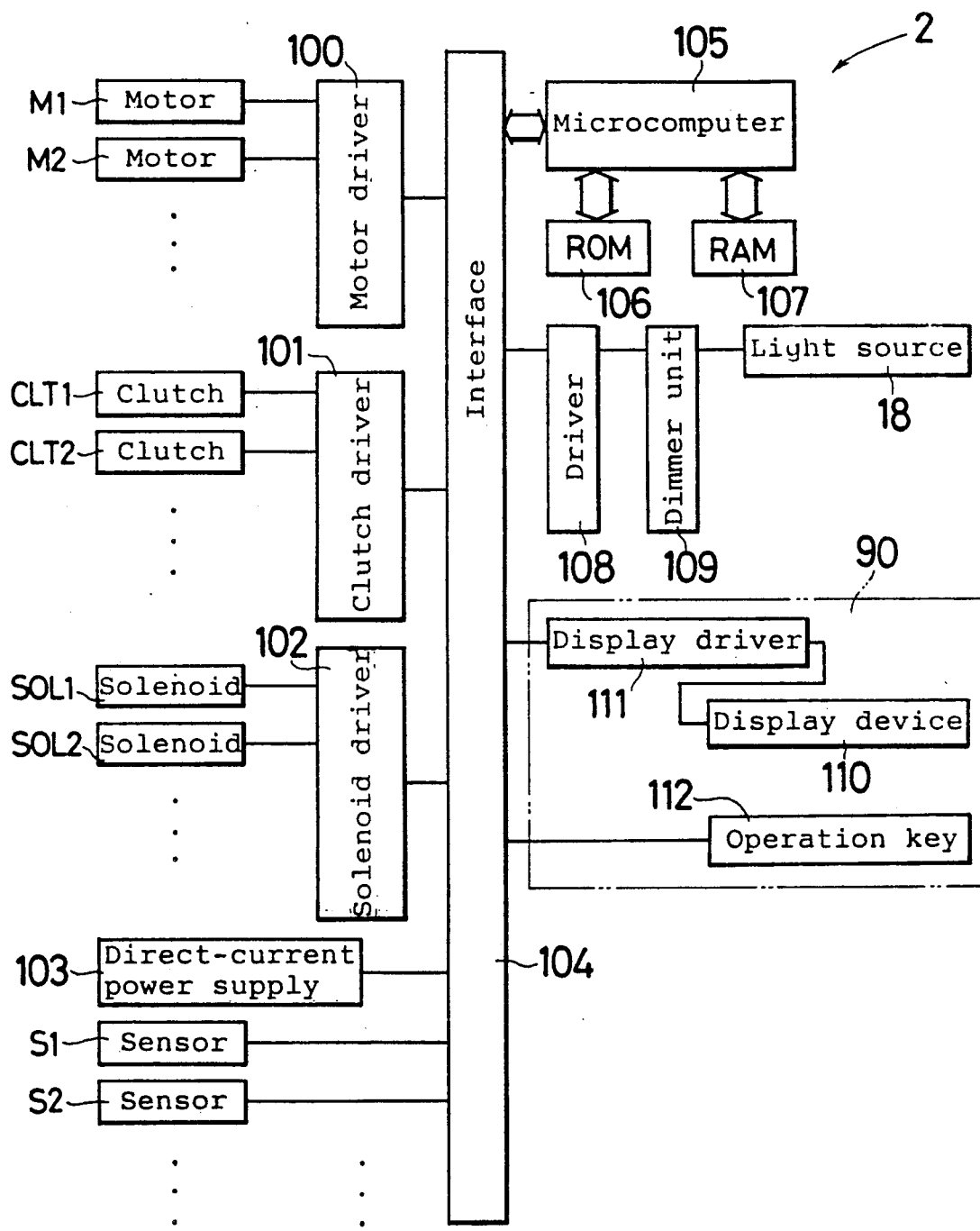
FIG. 11 is a block diagram showing an electrical configuration of a copying machine 2.

Referring to FIGS. 9 through 11, a configuration and operation of the copying machine 2 will be explained below.

Referring to FIG. 9, in a body 3 of the copying machine 2, exposure means 17 extending perpendicularly to the paper surface with respect to the upper surface of the copying machine body 3, and driven in the directions of arrows 56, 57 is disposed. The exposure means 17 includes a light source 18 such as a halogen lamp and a reflector 19. Light generated by the light source 18 is irradiated onto the document surface and selectively absorbed corresponding to a document image. The reflected light from the document surface is guided to a right cylindrical photoreceptor 26 having an axial line vertical to the paper surface, through the reflectors 19, 22, 23, a zoom lens 24 and a reflector 25 and forms an image in an exposure region 26a.

Relating to the photoreceptor 26, there is a corona discharger 27 for charging uniformly charging the surface of the photoreceptor 26 before exposure. As the light corresponding to the document image is led into the exposure region 26a, the surface of the photoreceptor 26 is selectively destaticized, and an electrostatic latent image corresponding to the document image is thereby formed. The electrostatic latent image is converted into a sensible toner image by the function of a developer 28 disposed on the downstream side in the rotating direction of the photoreceptor 26 from the exposure region 26a. The toner image is transferred onto a copying paper P transported by the structure to be described later. In the transfer region 30, the corona discharger 29 serves to transfer the toner image from the photoreceptor 26 to the copying paper. Toner remaining on the surface of the photoreceptor 26 after transfer is removed by a cleaning device 31. The copying paper P after transfer is transported to a fixing device 58, where the toner image transferred is heated and fixed.

Paper feed cassettes 32A through 32D for containing copying papers of different sizes respectively from its side wall are attached to the copying machine body 3. From one of these paper feed cassettes 32A through 32D, the copying papers mounted at the upper most side are led one by one into paper feeding paths 34A through 34D as paper feed rollers 33A through 33D are selectively rotated by the driving means such as a motor M1. In the paper feeding paths 34A through 34D and a paper feeding path 37 from an intermediate tray 36 to be described later, transporting rollers 38A through 38E are disposed respectively, and these transporting rollers are driven and rotated by a motor M2. By the function of these transporting rollers 38A through 34E, the copying papers P from the paper feed cassettes 32A through 32D and the intermediate tray 36 are led to the vicinity of the transfer region 30 of the photoreceptor 26.

In the transporting path between the paper feed paths 34A through 34D and the vicinity of the transfer region 30 of the photoreceptor 26, there are provided resist rollers 35A, 35B, to which the torque of the motor M2 is selectively transmitted through a clutch CLT5 to be described later. In this way, in synchronism with the toner image formed on the surface of the photoreceptor 26, transportation of the copying paper P to the transfer region 30 is controlled.

A discharge tray 40 is disposed on the side wall of the copying machine body 3. A solenoid SOL1 is installed on the discharge tray 40. By exciting the solenoid SOL1 for a predetermined time, the discharge tray 40 is shifted in a direction vertical to the paper surface in FIG. 4. For example, when the solenoid SOL1 is excited to shift the discharge tray 40 in the direction to the nearer side of the paper surface in FIG. 9 by a predetermined distance, when the solenoid SOL1 is excited next time, the discharge tray 40 is shifted in the direction from the surface to the back side of the paper surface in FIG. 5. By such operation of the discharge tray 40, plural copies of copying paper P onto which a set of plural sheets of documents D are copied are sorted, and in this state, they are placed on the discharge tray 40.

In relation to the discharge path 41 for discharging the copying papers P from the fixing device 58 to the discharge tray 40, an inverting path 42 which branches from the discharging path 41 and inverts the copying papers P upside down is provided. The copying papers P after copying from the fixing device 58, are discharged into the discharge tray 40 in the following three modes corresponding to each of the operation modes of the copying machine 2 set by the operation of the operator to be described later.

(1) To pass the discharge path 41 and discharged into the discharge tray 40.

(2) To be led from the discharge path 41 to the inverting path 42 and stored temporarily in the intermediate tray 36 in order to copy on the other side of the copying paper P. The plural copying papers P stacked on the intermediate tray 36 are led into the vicinity of the transfers region 30 of the photoreceptor one by one, via the paper feed path 37 seriatim from the copying paper P on the bottom by means of a paper feed belt 39. The copying paper P, after transfer of the toner image on the other side, is led to the fixing device 58, and discharged into the discharge tray 40 through the discharge path 41 after the toner image is heated and fixed.

(3) To be led from the discharge path 41 to the inverting path 42 so as to be inverted upside down, then led again to the discharge path 41 and discharged to the discharge tray 40.

In order to realize these three discharging modes, the inverting path 42 comprises paths 42a, 42b which branch at two locations in the discharge path 41, a path 42C where the paths 42a, 42b are converged and a path 42d branching from the path 42C and directing to the intermediate tray 36.

At a branch point of the path 42a and the discharge path 41, a direction switching claw 43 is disposed, at a branch point of the paths 42a and 42b a direction switching claw 44, and at a branch point of the paths 42C and 42d a direction switching claw 45 are installed respectively, and they are operated by solenoids SOL, SOL3, SOL4 (not shown, to automatically select the transporting path of the copying papers P responsive to the copying contents desired by the operator.

Near the branch point of the paths 42a, 42b, rollers 47a through 47C are disposed, and near the branch point of the paths 42C, 42d, rollers 49A through 49C are arranged for transporting the copying paper P. In the path 42C near the branch point of the paths 42a, 42b, an inverting roller 48 is disposed and rotated in normal and reverse directions by means of a driving motor M5 so as to invert the transporting direction of the copying paper P, and another inverting roller 50 is installed at the downstream side of the branch point of the paths 42c, 42d so as to be rotated in normal and reverse directions by means of a motor M6.

Furthermore, a discharge paper sensor S1 is installed near the outlet of the discharge path 41, paper inversion sensors S2, S3 near the inlet of the path 42a and in the path 42c, and an intermediate tray inlet sensor S4 near the outlet of the path 42d. The transporting rollers 46A through 46C are arranged along the discharge path 41, and a transporting roller 51 is disposed in the path 42d. These transporting rollers 46A through 46C are driven by the motor M4 in synchronism with the copy processing portions such as the photoreceptor 26 and the fixing device 58.

In the configuration mentioned above, in the case of a discharge mode (1), the path 42a is closed by the switching claw 43, and the copying paper P is discharged along the discharge path 41. In the case of mode (2), the discharge path 41 is closed by the switching claw 43 to lead the copying paper P to the path 42a of the inverting path 42, then the path 42C is open by the switching claw 44 to lead the copying paper therethrough, and the transporting direction is inverted by the inverting roller 50. Then, the path 42d is opened by the switching claw 45 to lead the copying paper P to the intermediate tray 36. In the case of mode (3), after leading the copying paper P into the path 42C, the transporting direction is inverted by the inverting roller 48 and the copying paper is led from the path 42b to the discharge path 41 by the switching claw 44.

Though the operating modes of the copying machine 2 change frequently, at this time, the exposure means 17 is stopped at positions designated by the reference characters 52, 53 in relation to the first and second reading stations 10, 11, or driven in the direction of arrow 56 at a uniform speed between a position indicated by the reference character 4 and a position shown by the reference character 55, thereby scanning the document surface. Sensors S5, S6 are installed respectively in relation to the positions indicated by the reference characters 52, 53 to detect the exposure means 17 and to stop it reliably at the stop position. A similar sensor S7 is also installed in relation to the stop position shown by the reference character 5 of the exposure means 17 corresponding to one edge portion of the placing range of the document related to the document table 5.

Moreover, in order to transport the copying paper P in synchronism with the electrostatic latent image formed on the photoreceptor 26, sensors S8, S9 are disposed respectively in the paper feed path 34A and the transporting path between the paper feed path 34A and the resist rollers 35A, 35B. Meanwhile, a similar sensor (not shown) is installed in relation to the paper feed paths 34B through 34D. A sensor S10 arranged in the paper feed path 37 detects the copying paper, P, copied on one side, taken out from the intermediate tray 36 by the paper feed belt 39 and transported by the transporting roller 38E. Also, a sensor S18 is disposed for detecting the copying paper P in the intermediate tray 36.

Near the outlet of the copying paper P of the fixing device 57, a sensor S11 is disposed, and in response to its output signal the operation of the rollers and direction switching claws provided at respective portions in the discharge path 4d1 and the inverting path 42 is controlled.

In the copying machine 2 including the document feeder 1, for example, the following copying operations are effected by multiple recirculations of a plurality of document sheets D.

(A) The operation for obtaining a plurality of sorted simplex copies from simplex documents.

(B) The operation for obtaining a plurality of sorted duplex copies from simplex documents.

(C) The operation for obtaining a plurality of sorted simplex copies from duplex documents.

(D) The operation for obtaining a plurality of sorted duplex copies from duplex documents.

FIG. 10 is a partial plan view of a control panel 90 disposed, for example, on the upper surface of the copying machine body 3. The control panel 90 comprises ten keys 91 for setting the number of copies, a clear key 92, a copying mode select key 93 for setting the copying conditions, an RDH function key 94 for activating-/inactivating the document feeder 1, a print switch 95 for instructing the start of the copying operation, a set number display 96 for indicating the number of copies set by the ten keys 91, a copy number display 97 for indicating the number of sheets copied, copying mode displays 98A through 98D for indicating copying mode selected by the copying mode select key 93, and an RDH function mode display 99. The copying mode displays 98A through 98D and the RDH function mode display 99 are realized by providing a light emitting diode, and when each of the modes is selected, the light emitting diode is illuminated.

The copying mode displays 98A through 98D indicate four copying modes (A) through (D) stated above, that is, to obtain simplex copies from simplex documents (SIMPLEX → SIMPLEX), to obtain duplex copies from simplex documents (SIMPLEX → DUPLEX), to obtain simplex copies from duplex documents (DUPLEX → SIMPLEX) and to obtain duplex copies from duplex documents (DUPLEX → DUPLEX).

Whenever the copying mode select key 93 is pressed, the copying mode is selected seriatim from above, and the light emitting diode of respective displays 98A through 98D is illuminated. However, when the copying mode select key 93 is pressed while the copying mode display 98D is illuminated, the copying mode is changed to SIMPLEX → SIMPLEX and indicated on the copying mode display 98A.

The document feeder 1 is activated when the RDH function mode display 99 is illuminated by pressing the RDH function mode key 94, and is inactivated when it is turned off. That is, the operator, when placing a document such as a book on the document table 5 to obtain the copy image on the copying paper P, operates the RDH function key 94 to turn off the RDH function mode display 99. Also, when copying by transporting the document D using the document feeder 1, the RDH function mode display 99 is illuminated.

When the RDH function is used, the operator sets the copying mode in the manner described above by operating the copying mode select key 93. Then, by operating the ten keys 91, the number of copies required is set. At this time, the number of copies set is indicated on the set number display 96.

When the print switch 95 is pressed in succession of operating the ten keys 91, the document feeder 1 and the copying machine body 3 cooperate to start the copying operation. At this time, the number of copies finished is shown sequentially on the copy number display 97. When the set number indicated on the set number display 96 and the numerical value shown on the copy number display 97 coincide, the operation of the copying machine 2 is stopped and the display of the set number display 96 is reset to "0". At this time, the display on the copy number display 97 is not reset and kept as it is until the print switch 95 is pressed.

FIG. 11 is a block diagram showing an electrical configuration of the copying machine 2. The plurality of motors M1, M2 ... are connected to a motor driving circuit 100, clutches CLT1, CLT2, ... to a clutch driving circuit 101, and the plurality of solenoids SOL1, SOL2, ... to a solenoid driving circuit 102. Control elements used in document transport control, copying paper transport control and copying process control such as the driving circuits 100 to 102 and the DC power supply 103 are connected to an interface circuit 104. The sensors S1, S2, ... and further a processing circuit 105 realized by a microcomputer and so on are connected to the interface circuit 104. Signals from the sensors S1, S2, ... are given to the processing circuit 105, in which arithmetic processing corresponding to the signals are executed, and drive control signals are given to each of the driving circuits 100 to 102 via the interface 104.

To the processing circuit 105, a ROM (read-only memory) 106 and a RAM (random access memory) 107 are connected. The processing circuit 105 controls and operates according to the control program stored in the memory 106, using the memory region of the memory 107 as the working region.

The interface circuit 104 is connected to a dimmer unit 19 which energizes the light source 18 of the exposure means 17 via the driving circuit 108, and at the same time, gives display control signal to each of the displays 110 (including displays 96, 97, 98A through 98D, 99) of the control panel 90 via the display driving circuit 111, and is connected to control keys 112 (including keys 91 through 95).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A recirculating sheet feeding apparatus which feeds a sheet from a top of a stack of sheets contained in a containing member, and returns the sheet to the bottom of the stack of sheets, comprising:
    a vacuum suction feeder disposed on an upper opposite side of the containing member for sucking a sheet on top of the sheets contained to feed the suctioned sheet in a predetermined feeding direction;
    air injecting means installed on a downstream side in the feeding direction of the containing member for injecting air against a plurality of edges of said stack of sheets on the downstream side in the feeding direction of the sheet; and
    impact generating means for applying an upward impact only to the edges on the downstream side on the feeding direction of the stack of sheets contained in the containing member thereby enabling return of the sheet to the bottom of the stack without lifting the stack of sheets.

2. The recirculating sheet feeding apparatus as claimed in claim 1, wherein said impact generating means comprises,
    a rotary shaft disposed on the lower opposite downstream side in the feeding direction of the containing member,
    a feed roller fixed to the rotary shaft and having a projection formed throughtout a predetermined range of the peripheral surface of the feed roller,
    a kick-up member provided on the projection of and extending tangentially to the feed roller, and
    driving means for rotating the rotary shaft.

3. The recirculating sheet feeding apparatus as claimed in claim 2, wherein said kick-up member is driven reciprocally with said feed roller and displaced angularly within a predetermined angle.

4. The recirculating sheet feeding apparatus as claimed in claim 1, further including holding means for holding the downstream edges of loosened sheets in the feeding direction, said holding means being disposed between the downstream edges in the feeding direction of the sheets contained in the containing member and said air injection means.

5. The recirculating sheet feeding apparatus as claimed in claim 1, wherein
    a notch is provided on an upstream edge in the sheet returning direction of the containing member, upper and lower rotary shafts being disposed underneath the notch and connected respectively to driving means for returning the sheet fed to the containing member,
    the upper rotary shaft comprising a driven roller engaged rotatably thereto, and a feed roller having a claw for pushing out the rear edge of the sheet when the upper rotary shaft is rotated, the claw of said feed roller rotating through said notch in order to contact with and assist in the return of the sheet to the bottom of said stack, and
    the lower rotary shaft including a driving roller contacting the driven roller.

6. A recirculating sheet feeding apparatus having a containing member containing a stack of sheets, which feeds a sheet from a top of the stack of sheets, and returns the sheet to the bottom of the stack of sheets, comprising:
    a first rotary shaft disposed on an upstream side in the sheet returning direction of the containing member;
    a driven roller rotatably engaged on the first rotary shaft;
    a feed roller fixed on the first rotary shaft and having a claw for pushing up the edge of a sheet in the sheet returning direction of the sheet when the sheet is returned to the bottom of the stack of sheets within the containing member without lifting the stack of sheets.
    first driving means for ratably driving the first rotary shaft;
    a second rotary shaft disposed under the first rotary shaft;
    a driving roller fixed on the second rotary shaft in contact with the driven roller; and
    second driving means for rotatably driving the second rotary shaft.

7. The recirculating sheet feeding apparatus as claimed in claim 6, wherein a rib is formed within the containing member along a transporting direction of the returned sheet.

8. A recirculating sheet feeding apparatus which feeds a sheet from a top of a stack of sheets contained in a containing member, and returns the sheet to the bottom of the stack of sheets, comprising:
    a vacuum suction feeder disposed on an upper opposite side of the containing member for sucking a top most sheet and feeding the suctioned sheet in a predetermined feeding direction;
    air injecting means installed on a downstream side in the feeding direction of the containing member for injecting air against edges of the stack of sheets on the downstream side and in the feeding direction thereof; and
    impact generating means for applying an upward impact to the downstream edges in the feeding direction of the stack of sheets contained in the containing member, wherein said impact generating means includes
    a rotary shaft disposed on the lower opposite downstream side in the feeding direction of the containing member, a feed roller fixed to the rotary shaft and having a projection formed throughtout a predetermined range of the peripheral surface of the feed roller, a kick-up member provided on the projection of and extending tangentially to the feed roller, and driving means for rotating the rotary shaft.

9. The recirculating sheet feeding apparatus as claimed in claim 8, wherein said kick-up member is driven reciprocally with said feed roller and angularly displaced within a predetermined angle.

10. The recirculating sheet feeding apparatus as claimed in claim 8, further including holding means for holding the downstream edges of loosened sheets in the feeding direction thereof, said holding means being disposed between the downstream edges in the feeding direction of the sheets contained in the containing member and said air injection means.

11. The recirculating sheet feeding apparatus as claimed in claim 8, further including
a notch provided in an upstream edge in the sheet returning direction of the containing member,
a secondary rotary shaft disposed beneath said rotary shaft, the rotary shaft comprising a driven roller engaged rotatably therewith, and
a driving roller formed on the lower rotary shaft contacting the driven roller.

12. A recirculating sheet feeding apparatus which feeds a sheet from a top of a stack of sheets contained in a containing member, and returns the sheet to the bottom of the stack of sheets, comprising:
a vacuum suction feeder disposed on an upper opposite side of the containing member for sucking a topmost sheet and feeding the suctioned sheet in a predetermined feeding direction;
air injecting means installed on a downstream side in the feeding direction of the containing member for injecting air against edges of the stack of sheets on the downstream side and in the feeding direction thereof;
impact generating means for applying an upward impact to the downstream edges in the feeding direction of the stack of sheets contained in the containing member; and
holding means for holding the downstream edges of loosened sheets in the feeding direction thereof, said holding means being disposed between the downstream edges in the feeding direction of the sheets contained in the containing member and said air injection means.

13. The recirculating sheet feeding apparatus as claimed in claim 12, wherein said impact generating means includes
a rotary shaft disposed on the lower opposite downstream side in the feeding direction of the containing member,
a feed roller fixed to the rotary shaft and having a projection formed throughout a predetermined range of the peripheral surface of the feed roller,
a kick-up member proved on the projection of and extending tangentially to the feed roller, and
driving means for rotating the rotary shaft.

14. The recirculating sheet feeding apparatus as claimed in claim 12, wherein said kick-up member is driven reciprocally with said feed roller and angularly displaced within a predetermined angle.

15. The recirculating sheet feeding apparatus as claimed in claim 12, further including
a notch provided on an upstream edge in the sheet returning direction of the containing member, and
upper and lower rotary shafts disposed underneath the notch and connected respectively to a driving means for returning the sheet fed to the containing member,
the upper rotary shaft including a driven roller rotatably engaged therewith and said impact generating means,
the lower rotary shaft including a driving roller contacting the driven roller.

* * * * *